United States Patent Office 3,368,429
Patented Feb. 13, 1968

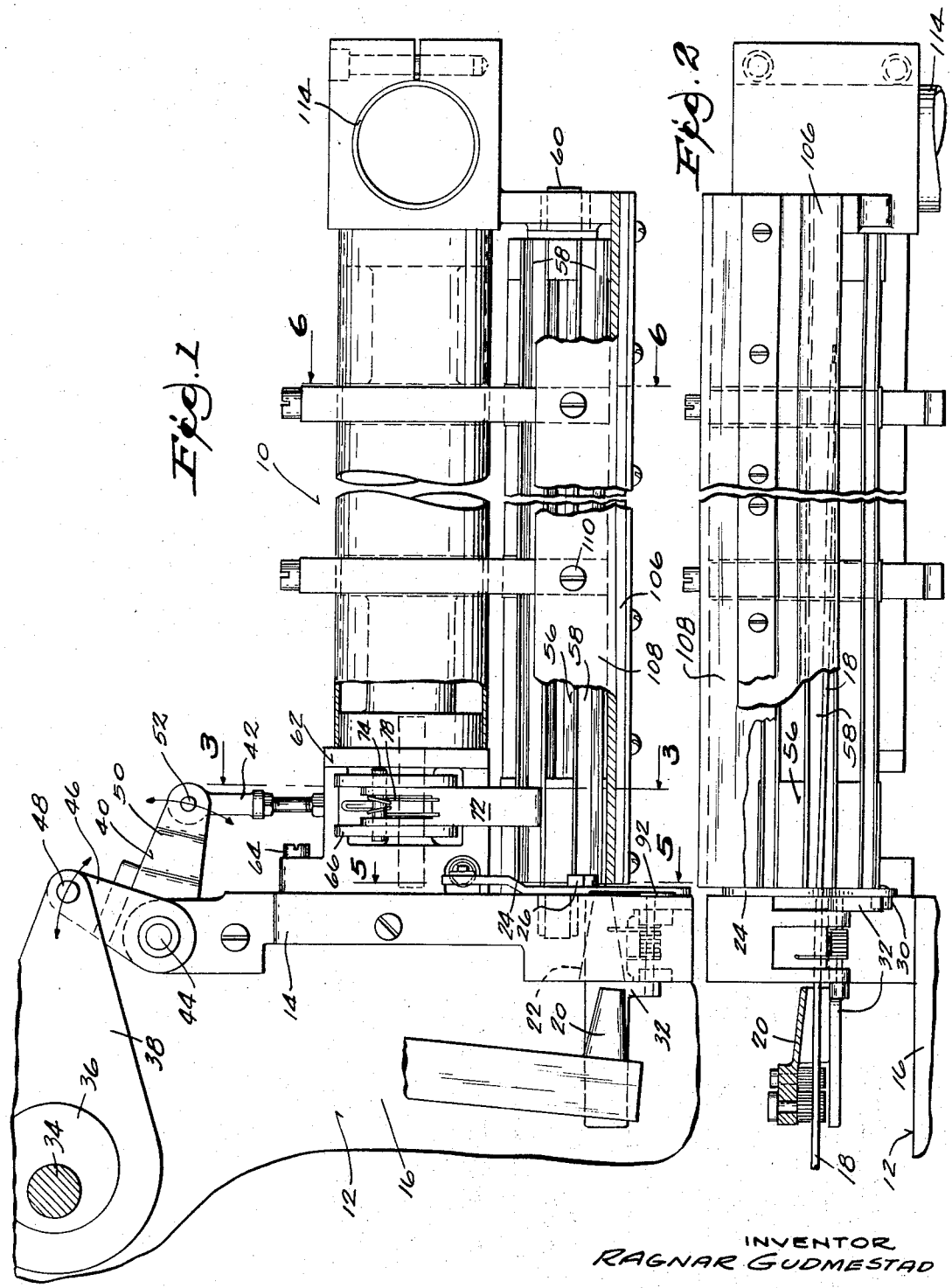

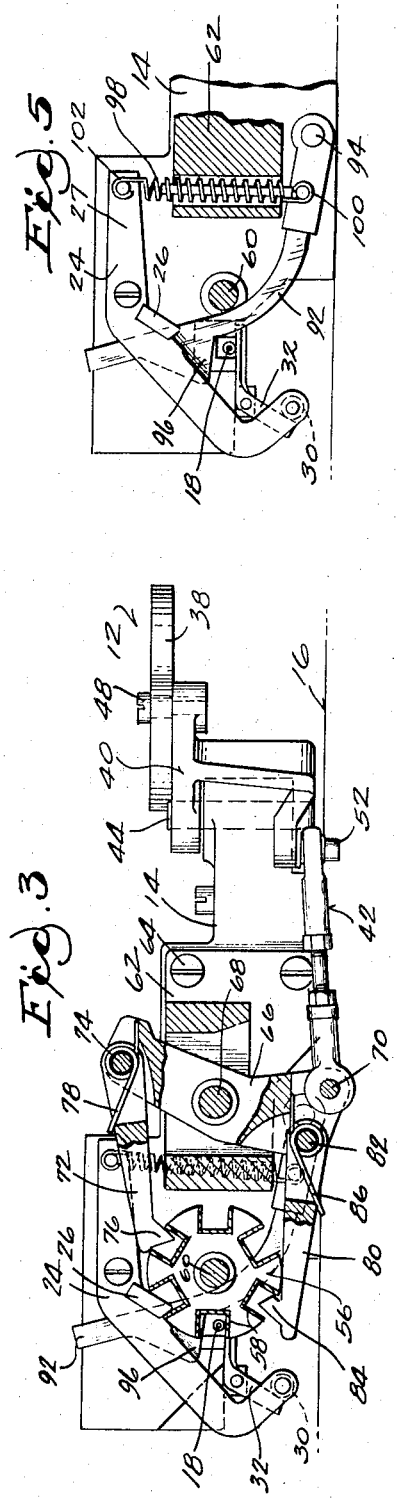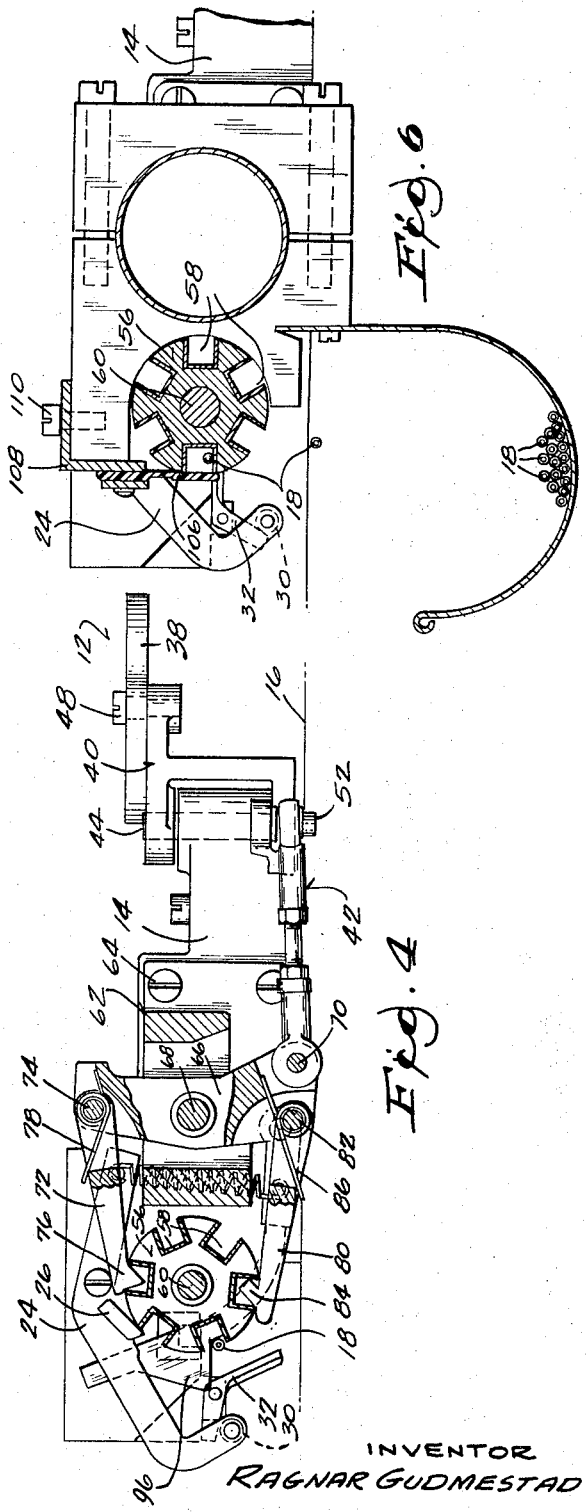

3,368,429
WIRE COLLECTOR OPERATING IN SYNCHRONISM WITH A WIRE PROCESSING MACHINE
Ragnar Gudmestad, West Allis, Wis., assignor to Artos Engineering Company, New Berlin, Wis., a corporation of Wisconsin
Filed Apr. 14, 1967, Ser. No. 631,012
17 Claims. (Cl. 81—9.51)

ABSTRACT OF THE DISCLOSURE

A wire collector having an elongated member provided with a plurality of pockets for receiving wire strands from a processing machine the wire receiving member being mounted for rotation in timed relation to the processing machine for receiving successive wire strands therefrom and for depositing the same in an orderly manner.

BACKGROUND OF THE INVENTION

In the production of terminal strips for use as electrical conductors or the like, it is common practice to employ automated apparatus. Such equipment is adapted to withdraw insulated wire as a continuous strand from a supply source, cut the wire into successive predetermined lengths, and perform other desired operations such as the stripping of insulation from one or both ends of the wire. Many such machines are commercially available, one of which is shown and described, for example, in my copending United States patent application Ser. No. 578,-580, filed Sept. 12, 1966.

While these commercially available cutting and stripping machines quite adequately perform their intended functions in the continuous production of successive lengths or strands of wire in an automatic manner, the problem of receiving and collecting the successive strands as discharged from the wire cutting and/or stripping machine is presented. Since the wire strands may be of variable lengths dependent upon the setting of the wire cutting and stripping machine, coupled with the fact that the wire being worked upon is, in many cases, extremely thin and highly flexible and therefore susceptible to tangling or knotting, the orderly collection and stacking of these wire strands in timed reation with the production thereof has been extremely difficult if not impossible.

SUMMARY OF THE INVENTION

It is therefore a primary object of this invention to provide an automatically operable device which is simple and economical in construction for receiving and collecting successive wire strands, as discharged from a cutting and/or stripping machine, in a highly efficient and orderly manner.

Another object of the invention is to provide an improved wire collecting device which is readily attachable to the discharge end of a wire cutting and stripping machine or the like and which is adapted to render the entire wire terminal production operation completely automatic.

A further object of the present invention is to provide an improved wire strand collector comprising, an elongated rotatable member having a plurality of outwardly-open wire-receiving pockets, means for mounting the elongated wire-receiving member on the discharge end of a wire-processing machine, and means for rotating the elongated wire-receiving member in timed relation with the wire-processing machine to successively bring the wire-receiving pockets in longitudinal alinement with the successive wire strands as they are discharged from the processing machine, the successive wires being permitted to drop by gravity from the successive pockets as rotation of the wire-receiving member is continued.

These and other objects and advantages of the present invention, and of the details of construction and mode of operation of the improved device, will become apparent from the following detailed description.

THE DRAWINGS

Referring to the drawings accompanying and forming a part of this specification wherein like reference characters designate the same or similar parts in the several views:

FIGURE 1 is a top view of a typical wire strand collector embodying the features of the present invention, portions being broken away to reveal normally hidden structure;

FIGURE 2 is a side view of the device with a part of the side curtain and its support broken away;

FIGURE 3 is a transverse section through the device taken along the line 3—3 of FIGURE 1;

FIGURE 4 is a section similar to FIGURE 3, but with the operating parts in different positions;

FIGURE 5 is a transverse section taken along the line 5—5 of FIGURE 1; and

FIGURE 6 is a transverse section taken along the line 6—6 of FIGURE 1.

DETAILED DESCRIPTION

Referring to the drawings, the wire collector embodying the present invention is designated generally by the reference character 10, and the wire processing machine to which it is applied is designated generally by the numeral 12. The wire processing machine 12 may be a cutting and stripping machine such as disclosed fully in my copending application Ser. No. 578,580, hereinabove identified, or it may be any other processing machine adapted to deliver successive wire lengths longitudinally to a discharge station, and ony a fragment of the discharge end of the machine 12 has therefore been shown herein.

The wire processing machine 12 as shown includes a frame portion 14 mounted on a stand or bed 16. In brief, lengths of wire or wire strands 18 processed by the machine 12 are fed in succession longitudinally through the nose piece or guide 20 by a feeder to a discharge station as defined by a discharge throat 22 in the frame portion 14. The discharge station of the processing machine 12 may also include wire supporting mechanism operated in timed relation with the wire feeding, cutting, and stripping or other processing mechanism. The wire supporting mechanism shown herein includes a crescent shaped trip lever 24 actuated through a trigger 26 as hereinafter more fully described, in timed relation with the wire processing mechanism and the wire collector, and one end of the trip lever 24 carries a roller 30 which rides along one leg of a pivotally mounted wire support 32 to swing the wire support away from its effective wire supporting position as the wire is delivered through the discharge station to the collector.

As described in my copending application, a rotatable shaft 34 of the processing machine 12 carries suitable cams for actuating the wire cutting and stripping or other processing mechanism. Mounted on and carried by this same shaft 34 is a cam 36 for actuating the wire collector 10 of the present invention in timed relation with the wire processing mechanism, and a cam follower 38 is driven by the cam 36 to impart motion to the drive elements of the collector through a bell crank 40 and connecting rod or lever 42 or the like as hereinafter more fully described. As shown, the bell crank 40 is pivotally mounted as at 44 on the frame 14 and has one leg or arm 46 thereof pivotally secured at 48 to the cam follower 38 and the other arm 50 pivotally secured at 52 to the rod 42.

The wire strand collector 10 of the present invention includes a generally cylindrical elongated member 56 provided with an annular series of longitudinally extending outwardly open wire receiving pockets 58. The member 56 thus forms a wire receiver which is mounted for rotation on the frame 14 at the wire discharge end of the cutting and stripping machine 12 adjacent the discharge station thereof. In the embodiment shown, the wire receiving member 56 has its shaft 60 journalled for rotation in a frame 62 which is secured to the frame 14 of the wire processing machine 12 as by means of machine screws 64 or the like, the member 56 being located so that the pockets 58 thereof may be brought into successive longitudinal alinement with the wire strands delivered through the discharge opening formed by the throat portion 22 and wire support 32. As shown, the member 56 has its axis offset laterally from the wire discharge station 22, 32 so that the successive wires 18 are delivered to the successive pockets 58 when the pockets are disposed in a horizontal plane laterally of the shaft 60 as in FIGURE 3.

The wire receiving member 56 is rotated in timed relation with operation of the wire processing machine 12 to bring the wire receiving pockets 58 successively into longitudinal alinement with the successive wire strands 18 through mechanical linkage with the rod 42 which is driven through the bellcrank 40 by the cam 36 and follower 38. As shown most clearly in FIGURES 3 and 4, a lever 66 pivotally mounted at its medial portion on a pin 68 has one end secured by a pin 70 to the end of the rod 42 remote from its connection 52 to the bellcrank arm 50, and swimming or rocking movement is thus imparted to the lever 66 through the rod 42, in timed relation with the rotation of the drive shaft 34 of the wire processing machine 12.

The end of the lever 66 remote from its connection to the rod 42 in turn carries a pawl 72 secured to the lever 66 by a hinge or pivot pin 74, the pawl 72 having an actuating nose 76 engageable with the pockets 58 of the wire receiving member 56 and being constantly resiliently urged toward the member 56 by a spring 78 carried by the pin 74. Thus, as the lever 66 is rocked or swung about its pivot 68 in a counterclockwise direction as viewed in FIGURES 3 and 4, the pawl 72 rotates the member 56 counterclockwise through engagement of the nose 76 of the pawl with one of the pockets 58 of the member 56, the nose 76 of the pawl being formed with an inclined rear edge to permit it to ride over the open mouth of the pocket on its return stroke.

The lever 66 also carries a second pawl 80 secured thereto remote from the pawl 72 by means of a hinge or pivot pin 82, and since the pawls 72, 80 are located on opposite sides of the pivot 68, they are reciprocated in opposite directions as the lever 66 is rocked. As in the case of the first pawl 72, the pawl 80 has an actuating nose 84 engageable with the pockets 58 of the member 56, and this pawl is also constantly resiliently urged toward the member 56 as by means of a spring 86 coiled about the pin 82 with its opposite ends coacting with the lever 66 and pawl 80 respectively. However, in contrast to the pawl 72, the nose 84 of the pawl 80 is designed for actuating engagement with the successive pockets 58 upon movement of the pawl 80 to the right with the forward edge of the nose 84 being inclined for sliding movement out of the pocket when the pawl is moved to the left as viewed in FIGURES 3 and 4. Thus, whenever the lever 66 is swung counterclockwise, both of the pawls 72, 80 engage within pockets 58 and jointly cooperate to rotate the wire receiving member 56 by a predetermined increment as determined by the extent of movement of the lever 66 through its connection with the rod 42, and upon clockwise rotation of the lever 66, both pawls 72, 80 become disengaged from the respective pockets 58 and are returned for the start of a subsequent operation.

With the mechanism thus described for rotating the wire receiver 56 in timed relationship with the operation of the wire processing machine, successive ones of the pockets 58 are brought into the position shown in FIGURE 3 precisely at the same time as a finished wire strand is delivered to the discharge station, and as the wire strand 18 is fed to the pocket 58 at the discharge station of the machine 12, the wire support 32 is effective to support the wire. Then, as the wire receiver 56 is rotated by the pawls 72, 80 to bring the next successive pocket 58 into position at the discharge station of the machine 12, the support 32 is tripped or swung away from its supporting position as shown in FIGURE 4 and the wire strand 18 which had been fed to the preceding pocket 58 is permitted to drop from the pocket into a wire collecting trough 90 or the like. While the wires would normally fall freely from the pockets 58 by gravity as the pockets reach a position wherein they are downwardly open, a wire ejector has nevertheless been provided for insuring removal of the wires from the pockets 58 at the proper time and this wire ejector is most clearly shown in FIGURE 5. As shown, the wire ejector consists of an arcuately shaped lever 92 swingably mounted on a pivot pin 94 adjacent one end thereof, the lever 92 having an ejector blade 96 remote from its pivot 94. The ejector lever 92 is actuated by movement of the lever 24 and for this purpose, a relatively stiff but somewhat resilient link 98 is utilized, the link 98 having an end secured as at 100 to the ejector lever 92 between its pivot 94 and ejector blade 96, the other end of the link 98 being secured to the arm 27 of the crescent shaped lever 24 as at 102. As shown, it is preferred to impart some resiliency to the link 98, and this link may, therefore, consist of a rigid pin embraced by a stiff spring. Thus, with the support 32 constantly resiliently urged into wire supporting position as shown in FIGURES 3 and 5, the crescent shaped lever 24 is likewise resiliently urged counterclockwise about its pivot 25 through coaction of the roller 30 with the depending leg of the support 32, and whenever the trigger 26 is alined with one of the pockets 58, the lever 24 is automatically swung into a position wherein the trigger 26 is seated within the pocket. Since the wire ejecting lever 92 is coupled with the lever 24 through the link 98, it normally assumes the position shown in FIGURE 5 wherein the ejecting blade 96 is positioned above the wire delivery and discharge station. However, as the lever 24 is rocked about its pivot 25 to the position shown in FIGURE 4 wherein the wire support 32 is swung away from supporting position, the wire ejector is simultaneously swung through link 98 about its pivot 94 in a counterclockwise direction so that the blade 96 positively ejects the wire 18 from the pocket 58 at the proper moment as illustrated in FIGURE 4.

To additionally insure that the wire strand 18 is confined to the pocket 58 at the delivery or discharge station, a resilient plastic flap 106 may also be provided as shown in FIGURE 6, the wire confining flap 106 being suitably secured to a bracket 108 mounted on and secured to the wire collector frame 62 as by means of machine screws 110 or the like. The plastic flap or curtain 106 should, of course, be stiff enough to effectively act as a closure for the open side of the pocket as it is positioned at the discharge station of the machine 12, but it should be flexible enough so as not to interfere with movement of the rotatable wire receiver 56. It should also be understood that the rod 42 may be formed with a threaded shank 112 for permitting longitudinal adjustment, and the frame 62 may, of course, be comprised of two or more sections suitably supported as by means of an adjustable leg 114 at its outer end remote from the frame 14 of the wire processing machine 12. Also, the wire receiving member or magazine 56 may be fabricated of a plurality of spaced discs having alined peripheral notches for receiving the channel-shaped pockets 58 or this member 56 may be enclosed as a tube, and the entire wire collector may be protectively housed within a casing or may be left open, as desired.

Various modes of carrying out the invention are contemplated as being within the scope of the following claims particularly pointing out and distinctly claiming the subject matter which is regarded as the invention.

I claim:

1. A wire strand collector comprising, an elongated member having a plurality of longitudinally extending outwardly open wire receiving pockets, means for mounting said elongated wire receiving member for rotation on the discharge end of a wire processing machine operable to deliver successive wire strands to a discharge station, and means for rotating said wire receiving member in timed relation with the wire processing machine to bring the wire receiving pockets successively into longitudinal alignment with the successive wire strands delivered by the processing machine at the discharge station, whereby said wire strands are received in the successive pockets and are advanced by the rotation of the wire receiving member until they fall by gravity from the successively advancing pockets.

2. A wire strand collector according to claim 1, wherein an upwardly open elongated trough is provided below the rotatable wire receiving member for reception of the successive wire strands dropped therefrom.

3. A wire strand collector according to claim 1, wherein the means for rotating the wire receiving member includes at least one actuator engageable with successive pockets of said member.

4. A wire strand collector according to claim 3, wherein the actuator is a pawl carried by a lever operably connected to the operating mechanism of the wire processing machine.

5. A wire strand collector according to claim 4, wherein the lever is connected to the operating mechanism of the wire processing machine by a connecting rod driven through a bell crank by a cam and cam follower.

6. A wire strand collector according to claim 1, wherein the means for rotating the wire receiving member includes a pair of pawls each engageable with successive pockets of said member and connected to opposite ends of a lever swingably supported at its medial portion and operably connected to the operating mechanism of the wire processing machine.

7. A wire strand collector according to claim 6, wherein the pawls are simultaneously operable and cooperate to rotate the wire receiving member by predetermined increments in one direction only.

8. A wire strand collector according to claim 1, wherein the wire receiving member is rotated by predetermined increments in one direction and means is provided for positively preventing reverse rotation of said member.

9. A wire strand collector according to claim 8, wherein the means for preventing reverse rotation of the wire receiving member is a trigger stop carried by a lever and engageable with successive pockets of said wire receiving member.

10. A wire strand collector according to claim 9, wherein a wire support is also provided for supporting and guiding the wire strands from the discharge station to the successive pockets of the wire collector and the wire support is actuated by the lever carrying the trigger stop in timed relation to rotation of the wire receiving member.

11. A wire strand collector according to claim 10, wherein the wire support is constantly urged by spring action toward effective wire supporting position and is moved away from its effective position by the lever.

12. A wire strand collector according to claim 11, wherein the lever is actuated through the trigger stop by its coaction with the pockets of the wire receiving member upon rotation thereof to thereby move the wire support from its effective position.

13. A wire strand collector according to claim 1, wherein means is also provided for aiding in the removal of the successive wire strands.

14. A wire strand collector according to claim 13, wherein the means for aiding in removal of the wire strands is a pivotally supported ejector actuated in timed relation to rotation of the wire receiving member.

15. A wire strand collector according to claim 14, wherein a lever having a trigger engageable with the pockets of the wire receiving member for actuation thereby is coupled with the ejector for actuating the same.

16. A wire strand collector according to claim 15, wherein a wire support is also provided and the lever is also cooperable with the wire support for swinging the same away from its effective wire supporting position in timed relation with movement of the wire ejector.

17. A wire collector for use in collecting and depositing wire strands delivered in succession at the discharge station of a wire processing machine, said wire collector comprising, a rotatable elongated wire collecting member attachable to the processing machine adjacent the discharge station thereof, said wire receiving member having an annular series of outwardly open pockets extending longitudinally thereof and successively alineable with the discharge station of the processing machine, and means operable by the working performing mechanism of the processing machine and engageable with successive pockets of said wire receiving member for rotating said member in timed relation with the processing machine to advance successive pockets of said member into wire receiving position at the discharge station as successive wires are delivered thereto by the processing machine.

References Cited

UNITED STATES PATENTS

| | | | |
|---|---|---|---|
| 1,882,947 | 10/1932 | Rotherham | 81—9.51 |
| 3,029,494 | 4/1962 | Andren | 29—630 |
| 3,204,334 | 9/1965 | Long et al. | 29—630 |
| 3,263,316 | 8/1966 | Schrader | 81—9.51 X |

MILTON S. MEHR, *Primary Examiner.*